(No Model.)

E. HOLTHAUS.
RENDERING APPARATUS.

No. 594,014. Patented Nov. 23, 1897.

Attest:
L. Lee,
Edw. F. Kinsey

Inventor.
Emil Holthaus, per
Thomas S. Crane, Atty.

United States Patent Office.

EMIL HOLTHAUS, OF CANARSIE, NEW YORK, ASSIGNOR TO CYRUS C. CURRIER, OF SUMMIT, NEW JERSEY.

RENDERING APPARATUS.

SPECIFICATION forming part of Letters Patent No. 594,014, dated November 23, 1897.

Application filed July 16, 1897. Serial No. 644,768. (No model.)

*To all whom it may concern:*

Be it known that I, EMIL HOLTHAUS, a citizen of the United States, residing at Canarsie, county of Kings, State of New York, have invented certain new and useful Improvements in Appliances for Rendering-Tanks, fully described and represented in the following specification and the accompanying drawings, forming a part of the same.

The object of this invention is to furnish improved means for draining the liquid from the material in a rendering-tank at the close of the rendering operation and also for cooking the material more effectively in the lower part of a rendering-tank having a funnel-shaped bottom.

The invention will be understood by reference to the annexed drawings, in which—

Figure 1:
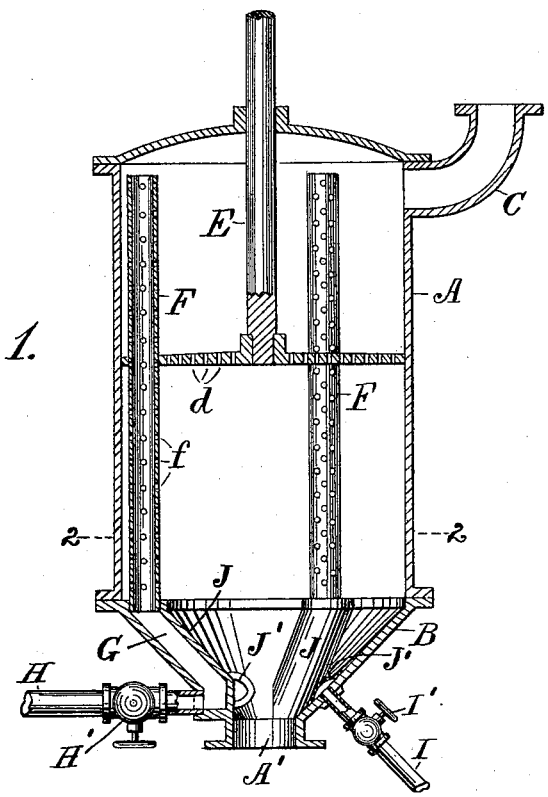
Figure 2:
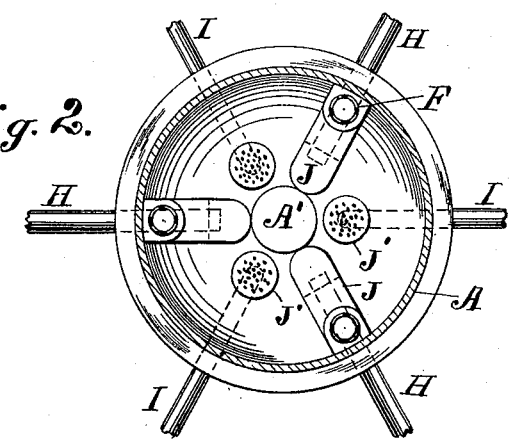

Figure 1 is a vertical section at the center line, where hatched, of a rendering-tank provided with stand-pipes having separate ducts and with steam-inlets upon the side of the bottom funnel, and Fig. 2 is a plan of the same in section on line 2 2 in Fig. 1.

The rendering-tank is shown formed of a vertical cylinder A, with funnel-shaped bottom B, having discharge-opening A'. A filling-inlet C is shown upon the side of the tank near the top, and a perforated piston D for pressing the material is shown within the tank, connected with a piston-rod E. In Fig. 1 three tubular stand-pipes F are shown provided with perforations $f$ and connected at the bottom with independent ducts J, containing passages G, cast upon the inner side of the funnel. The passages G are formed each at the bottom with an outlet-pipe H, and the pipes F are formed with the holes $f$ to admit the liquid which is expressed from the material by the piston D. The stand-pipes extend nearly to the top of the tank, and as they discharge by separate outlet-pipes H any sediment which collects in the passages G can be readily cleaned out by disconnecting the pipe H from such passages.

I are steam-pipes inserted through the side of the funnel near the bottom and covered each by a perforated cap or strainer J', adapted to exclude the material, while it admits the steam freely to penetrate the material in the bottom of the funnel. The steam thus introduced rises throughout the entire mass of material and operates to cook the same during the rendering operation, the plunger being raised to the top of the tank during such stage of the treatment. When the material is properly cooked, the steam is shut off from the pipes I and the piston D is forced downward. The piston presses the liquid from the material, a portion escaping from the perforations $f$ below the piston and the remainder escaping upwardly through holes $d$ in the piston and entering the perforations in the stand-pipes above the level of the piston.

The pipes H and I are shown provided, respectively, with cocks H' and I' to regulate the flow of the fluids, the cocks H' being closed and the cocks I' opened during the rendering operation and the reverse arrangement being employed during the pressing of the material. The cocks are all closed during the discharge of the material through the opening A', which may be facilitated by the downward movement of the piston, if required.

In practice the discharge-opening A' is provided with a gate and connected with apparatus for drying the compressed material, and it will be observed that the stand-pipes are close to the sides of the cylinder A, and the independent passages G, which are connected with the stand-pipes, are sloped downwardly within the sides of the funnel. With this construction neither the stand-pipes nor the passages G interfere with the movement of the material downward toward the opening A'. The material slides over the strainers J' without obstruction during its movement to the discharge-opening A', and any material which may clog the strainers during such movement is readily displaced by the steam-pressure when the steam is admitted to the pipes I.

The entire construction furnishes a means of steaming and draining the material in a very effective manner and of discharging the same with great facility from the rendering-tank.

What I claim, and desire to secure by Letters Patent, is—

1. A rendering-tank having the funnel B at the bottom with outlet A' at the center, and formed upon its sloping sides with the independent passages G provided each with outlet-pipe H, and the series of perforated stand-pipes extended vertically along the walls of the tank and connected each with one of the passages G, the material to be rendered filling the tank between the stand-pipes, and the fluid being strained and drawn from the material through the perforations in the stand-pipes, to the passages G and outlet-pipes H, substantially as herein set forth.

2. A rendering-tank having the funnel B at the bottom with outlet A' at the center, and formed upon its sloping sides with the independent passages G provided each with outlet-pipe H, the series of perforated stand-pipes connected each with one of the passages G, and the steam-inlet pipes I inserted through the sides of the funnel and covered each with the perforated pipes or strainers J', the whole being arranged and operated when the material is placed in the funnel, and between the stand-pipes, to introduce the steam to the material through the strainers J' during the cooking operation, substantially as herein set forth.

In testimony whereof I have hereunto set my hand in the presence of two subscribing witnesses.

EMIL HOLTHAUS.

Witnesses:
L. LEE,
EDW. F. KINSEY.